(12) United States Patent
van Zalinge

(10) Patent No.: US 6,205,094 B1
(45) Date of Patent: Mar. 20, 2001

(54) TRACKING SYSTEM FOR OPTICAL STORAGE MEDIA

(75) Inventor: Klaas van Zalinge, La Jolla, CA (US)

(73) Assignee: Thomson Licensing S.A., Boulogne (FR)

( * ) Notice: Subject to any disclaimer, the term of this patent is extended or adjusted under 35 U.S.C. 154(b) by 0 days.

(21) Appl. No.: 09/113,208

(22) Filed: Jul. 10, 1998

(30) Foreign Application Priority Data

Jul. 31, 1997 (EP) .................................................. 97401834

(51) Int. Cl.[7] ...................................................... G11B 7/13
(52) U.S. Cl. .................................... 369/44.25; 369/44.41; 369/124.01
(58) Field of Search ............................. 369/44.25, 44.26, 369/44.27, 44.28, 44.29, 44.32, 44.34, 32, 47, 58, 59, 124.01, 124.12, 124.15, 124.03, 110

(56) References Cited

U.S. PATENT DOCUMENTS

| 4,541,082 | * | 9/1985 | Horikoshi et al. | ............ 369/44.41 X |
| 4,866,397 |   | 9/1989 | Kimyacioglu | ........................ 330/252 |
| 5,258,968 |   | 11/1993 | Matsuda et al. | .................. 369/44.35 |
| 5,610,897 | * | 3/1997 | Yamamoto et al. | ............ 369/124.03 |

FOREIGN PATENT DOCUMENTS

| 0238162 A2 | 9/1987 | (EP) . |
| 0749118 A2 | 12/1996 | (EP) . |
| 07 296395 | 11/1995 | (JP) . |

OTHER PUBLICATIONS

European Search Report citing the above–listed reference: AA.
*Patent Abstracts of Japan, vol. 096, No. 003, Mar. 29, 1996 (Victor Co. of Japan,.Ltd.).
EPO Search Report dated: Dec. 30, 1997.

* cited by examiner

Primary Examiner—Muhammad Edun
(74) Attorney, Agent, or Firm—Joseph S. Tripoli; Joseph J. Laks; Paul P. Kiel

(57) ABSTRACT

A tracking system for optical storage media e.g. an optical disk, comprising a matrix of four sensors receiving a beam reflected by the disk; one processing channel for each sensor signal, including means for producing a binary signal from the sensor signal, and an adjustable edge delay circuit operating on the binary signal; one adder for each pair of channels corresponding to diagonal sensors of the matrix; and a phase detector comparing the outputs of the adders.

12 Claims, 5 Drawing Sheets

TRACKING SYSTEM FOR OPTICAL STORAGE MEDIA

FIELD OF THE INVENTION

The present invention relates to a tracking system for optical storage media e.g. for a laser disk, which insures a correct alignment of a laser beam on a track being read. The invention more specifically relates to a circuit for processing the signals provided by a photosensor.

FIG. 1 schematically shows a conventional tracking system for a laser disk. A laser beam L is directed perpendicularly to the surface of an optical disk 10 by a semi-reflecting transparent plate 12. A servo mechanism 13 displaces the laser beam L so that is follows the desired track of the disk. The laser beam reflected by disk 10 is sensed by a photosensor 14. A circuit 16 processes the signals provided by photosensor 14 to produce a tracking signal T indicative of the position of the laser beam on photosensor 14.

Tracking signal T is provided to a servo-control circuit 18 which accordingly controls the servo mechanism 13 to make the tracking signal converge to a desired value.

FIG. 2 shows in more detail the structure of a photosensor 14 used for optical storage media, e.g. laser disks, compact disks (CD), Digital Video Disks (DVDs), and illustrates the signals produced by such a photosensor when the laser beam is correctly aligned.

Photosensor 14 is a square matrix of four independent sensor areas A, B, C and D.

When the laser beam is correctly aligned, it produces a spot centered on sensor 14. The surface of the laser disk has a mirror layer and pits are used to store the digital information on the disk. Due to the depth of the pits, light from the laser will be reflected in-focus or out of focus to the photo-sensor. An in-focus reflection results in a clear spot on the sensor. To simplify, it can be said that the digital information on the laser disk results in a spot/no-spot signal on the sensor.

On the left of FIG. 2, it is schematically shown that the laser beam is passing from a non-reflective area to a reflective area, whereby circle S progressively fills with light. The unlit portion of circle S is shown in dotted lines. The interface I between the sensor pairs A/B and C/D is assumed to be parallel to the track being read. Then, the growing spot arriving on sensor 14 has a head edge E which moves along interface I, progressively scanning sensor 14 within circle S (from left to right in FIG. 2). On the right of FIG. 2, the laser beam is passing from a reflective area to a non-reflective area of the disk. Then, the spot progressively fades out as a tail edge E scans circle S along interface I.

When the laser beam is correctly aligned, sensor areas A and D receive the same amount of light at any time, which is also true for sensor areas B and C. When the spot starts to appear on the left of FIG. 2, signals A and D, produced by sensor areas A and D, progressively rise until edge E reaches the center of sensor 14. Then, signals A and D stay constant at a maximum value while signals B and C, produced by sensor areas B and C, start to rise progressively. Signals B and C reach their maximum value when the spot is full, i.e. when edge E reaches the right most limit of circle S.

When the spot starts to fade out, on the right of FIG. 2, signals A and D progressively decrease until edge E reaches the center of sensor 14. At this point, signals A and D are at their minimum value while signals B and C start to decrease progressively until the spot has completely faded out.

Waveforms A+C and B+D will be described later.

In FIG. 3, the laser beam is incorrectly aligned and produces a spot S on sensor 14 which is not centered. The spot will be shifted upwards or downwards, depending on the direction of the alignment error.

In the example of FIG. 3, the spot is shifted downwards. In this case, the light intensity received by sensor area D starts increasing or decreasing earlier than the light intensity received by area A, while the intensity received by area C starts increasing or decreasing later than the intensity received by area B. This is illustrated by the waveforms of signals A to D. Moreover, the maximum amplitude of signals A and B is lower than that of signals C and D, because sensor areas A and B will always receive less light than areas C and D.

It is to be understood that the description given above is schematic and describes the reality in a somehow simplified way.

It will be remarked that the misalignment of the laser beam is indicated both by the amplitude differences and the phase shifts of the sensor signals.

SUMMARY OF THE INVENTION

An object of the invention is to provide a simple, yet reliable, circuit for producing a tracking signal indicative of the alignment of the laser beam from the sensor signals.

Such a tracking signal circuit uses the phase differences and not the amplitudes of the sensor signals.

The invention more specifically aims at a tracking system for an optical disk, comprising matrix of four sensors receiving a beam reflected by the disk; one processing channel for each sensor signal, including means for producing a binary signal from the sensor signal, and an adjustable edge delay circuit operating on the binary signal; one adder for each pair of channels corresponding to diagonal sensors of the matrix; and a phase detector comparing the outputs of the adders.

According to an embodiment of the invention, the means for producing the binary signal comprises a limiter, the output signal of which is input to a data slicer which outputs the binary signal.

According to an embodiment of the invention, each edge delay circuit comprises means for charging a capacitor at a constant current when the corresponding binary signal switches to a first logic state; means for discharging the capacitor at said constant current when the binary signal switches to the second logic state; means for stopping charging and discharging of the capacitor between the moment when the voltage across the capacitor reaches a high threshold or a low threshold and a subsequent switching of the binary signal; and a first comparator connected to switch the state of an output signal when the voltage across the capacitor crosses a third threshold comprised between the first and second thresholds.

According to an embodiment of the invention, said means for charging, discharging and stopping comprise first and second equal value constant current sources coupled to a first supply terminal; a first switch controlled by the binary signal for selectively coupling the first current source to the first or second terminal of the capacitor; a flip-flop set to a first state when the high threshold is reached and set to a second state when the low threshold is reached; a second switch controlled by the flip-flop for selectively coupling the second current source to the first or second terminal of the capacitor; and third and fourth constant current sources having values equal to those of the first and second current sources, each coupling a second supply terminal to a respective terminal of said capacitor.

According to an embodiment of the invention, the adjustable delay circuit comprises a second comparator for setting the flip-flop to the first state, receiving the voltage on the first terminal of the capacitor and a first reference voltage; and a third comparator for setting the flip-flop to the second state, receiving the voltage on the second terminal of the capacitor and said first reference voltage.

According to an embodiment of the invention, the system comprises a servo-control system for displacing the beam in one direction perpendicularly to the disk tracks when the phase detector indicates a phase lag, and for displacing the beam in the opposite direction when the phase detector indicates a phase lead.

The foregoing and other objects, features, aspects and advantages of the invention will become apparent from the following detailed description of embodiments, given by way of illustration and not of limitation with reference to the accompanying drawings.

DETAILED DESCRIPTION OF PREFERRED EMBODIMENTS

As previously mentioned, a circuit according to the invention for processing the sensor signals A, B, C and D provided by sensor 14 only uses the phase differences between these signals to produce a tracking signal. This approach will allow the use of simple digital circuits early in the regulation loop. Digital circuits are preferred because their reliability is less process dependent than for analog circuits, and they will usually occupy less surface.

The phase differences which will be measured between the four sensor signals are particularly small and any phase offset error in one of the four signals will cause a substantial error in the resulting tracking signal. Such undesired phase offsets are critical in devices operating at high transfer rates, such as DVD units.

A solution for correcting these phase offsets is to insert an adjustable delay circuit in each of the sensor signal paths. Then, the delay circuit for the signal having the maximum phase lag is adjusted to a minimum value, while the delay circuit for the signal having the maximum phase lead is adjusted to the highest value. During the calibration of the system, the tracking loop is open. The laser disk does not rotate exactly around its center. Due to this, the laser will cover a track from the upper limit to the lower limit and the amplitude of the signal coming from the sensor will vary. With an averaging technique, the delays are adjusted such that they give all the same average result.

A problem lies in the choice of the delay circuits and of the elements to include in each signal path so that the processing circuit will operate at high frequency and occupy a minimum surface. The operation at high frequency is particularly critical in DVD units. This choice is one aspect of the invention.

Figure 1:
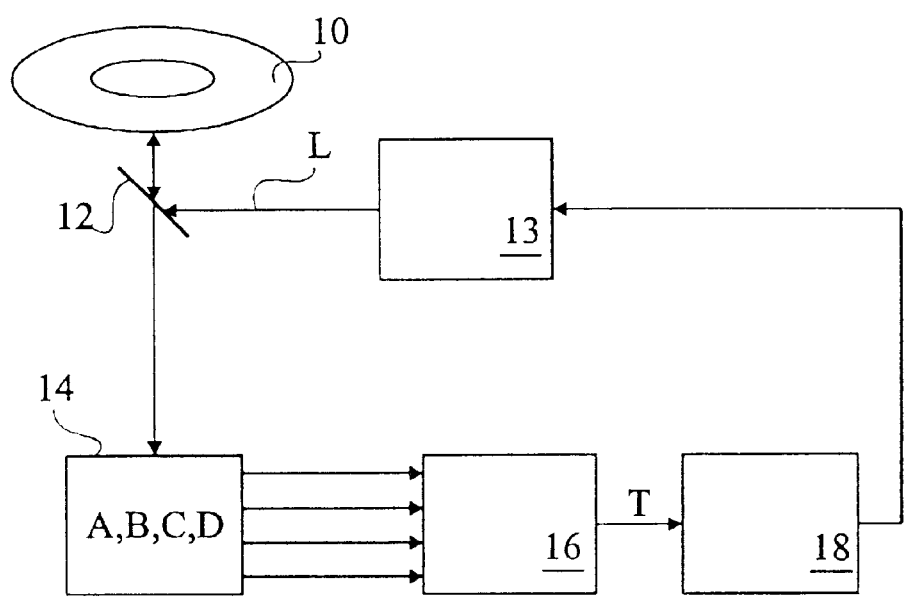
FIG. 1, previously described, schematically shows a tracking system for a laser disk.
Figure 2:
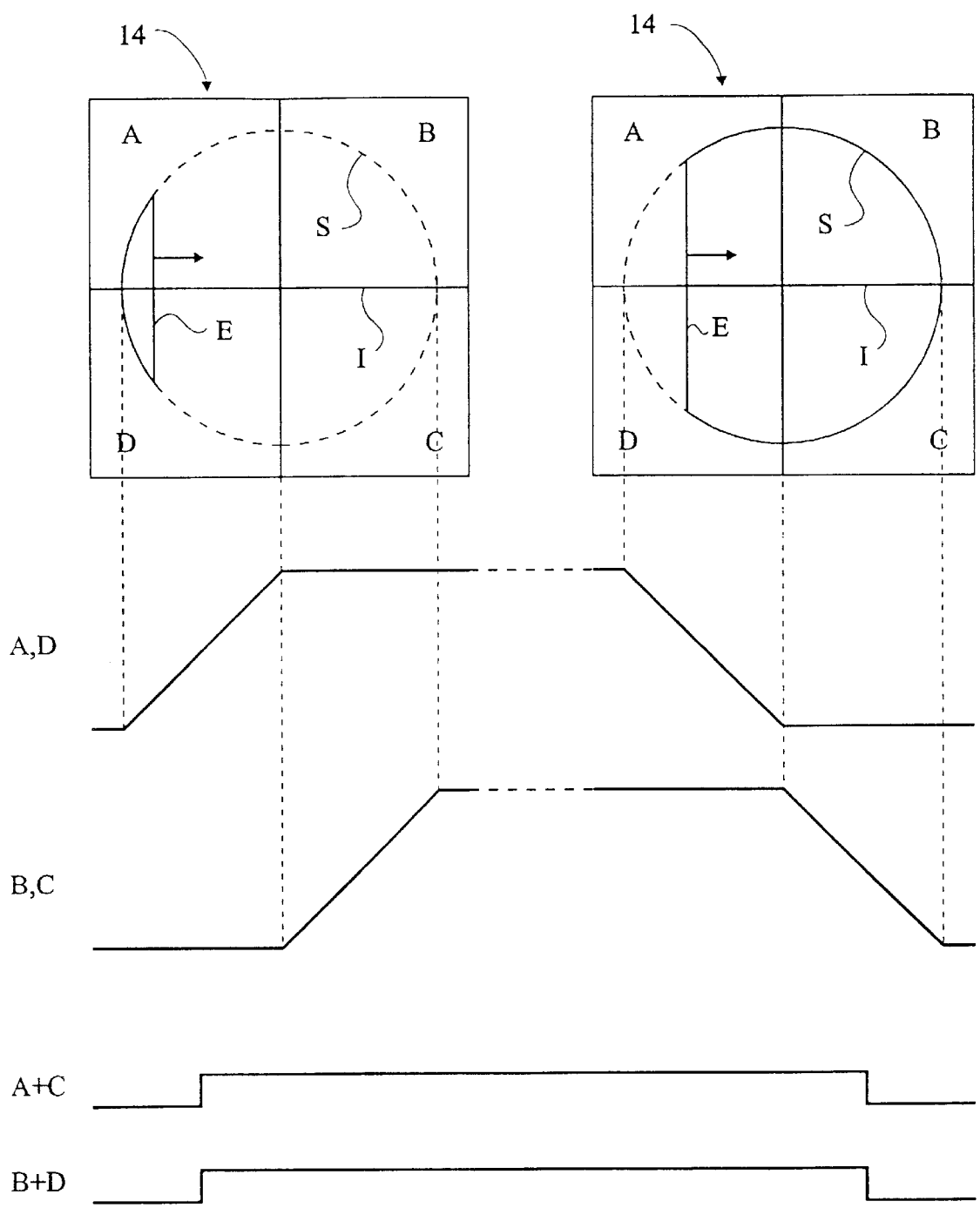
FIG. 2 schematically shows a specific sensor usable in a system such as that of FIG. 1, and illustrates the signals it produces when the laser beam is correctly aligned.
Figure 3:
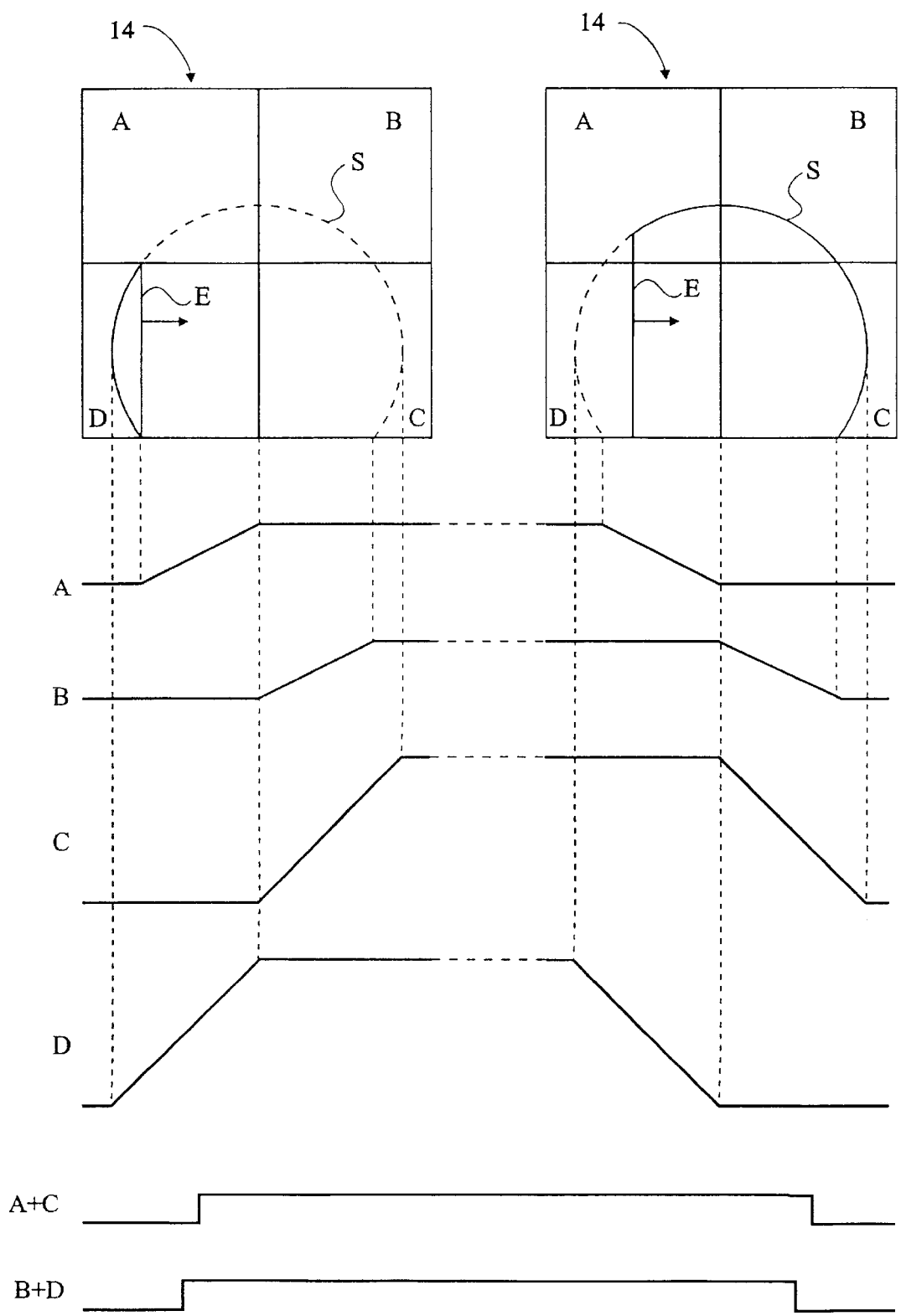
FIG. 3 schematically illustrates the signals produced by the sensor of FIG. 2 when the laser beam is not correctly aligned.
Figure 4:
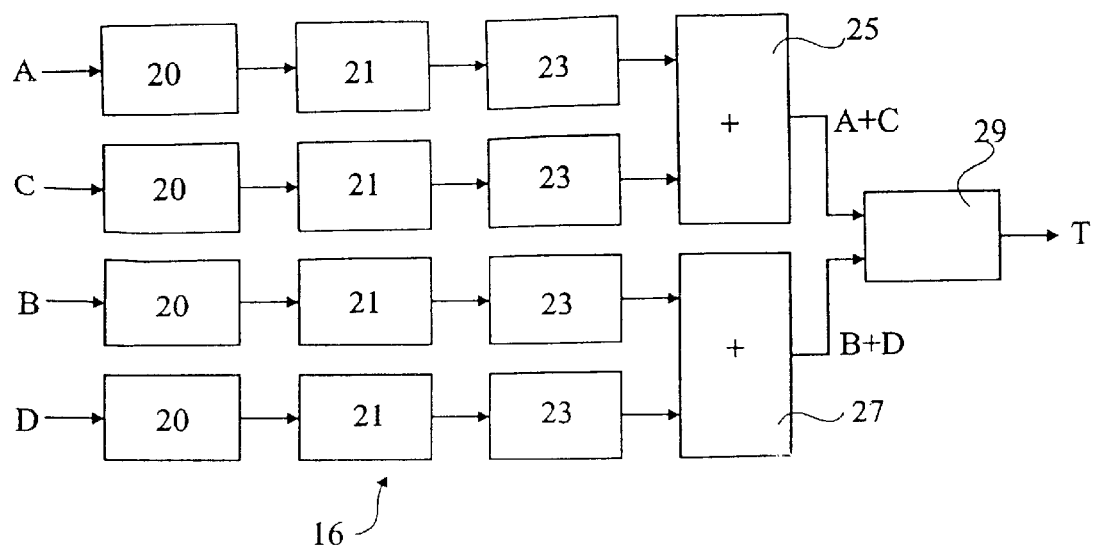
FIG. 4 schematically shows an embodiment of a circuit according to the invention for processing the signals delivered by the sensor.

FIG. 4 shows an embodiment of a tracking signal circuit 16 according to the invention. Each sensor signal A, B, C or D is provided to circuitry 20, 21 for converting the sensor signal into a binary signal. Circuit 20 may be a limiter which amplifies the corresponding sensor signal to such extent that its slopes become practically vertical and its amplitude reaches the power supply voltage of the circuit. Indeed, as illustrated in FIGS. 2 and 3, the slopes of the sensor signals are progressive. Additionally, the slopes have been shown as linear for sake of simplicity. In practice, they are not linear and are thus difficult to exploit.

Circuit 21 may be a data slicer or zero-crossing detector. The adjustable delay circuits 23 are placed after the data slicers 21. Thus, the adjustable delay circuits operate on binary signals. Since the amplitude differences of the sensor signals are not exploited, it is needless to use analog delay circuits which do not alter amplitude information.

A fast delay circuit for the invention will be easier to design than a fast analog delay circuit, since it will only need to delay signal edges and not signal shapes. An example of a particularly advantageous edge delay circuit will be described later.

An advantage of the quasi-linear edge delay circuit, especially as described below, is that it can easily be adapted to the operating frequency of the system by changing a bias current, a reference level, or a capacitor value.

In order to increase the transfer rate, especially in the case of the use of the disk as a data storage medium, e.g. in connection with a computer, it is desirable to increase the rotation speed of the disk, thereby increasing the maximum possible data transfer rate.

The group-delay of an analog system must be flat over the whole operating frequency range in order to operate correctly. Increasing the operating frequency in the system with analog delay-lines means a higher bandwidth for the analog circuits used to assure a flat group-delay. This demand for a larger bandwidth becomes very difficult to fulfill and will consume a lot of additional supply power. In a multi-standard system, the analog delay-line must be designed for the highest operating frequency. Changing the working frequency can be accomplished by changing bias-currents. Due to the large difference in operation frequency between the different standards, it becomes difficult to adapt the delay-lines for lower operating frequencies: only the bias current can be changed and it becomes very small for low-frequency, which makes it very sensitive to errors.

An adder 25 adds the outputs of the two adjustable delay circuits 23 of signals A and C, while an adder 27 adds the outputs of the two adjustable delay circuits 23 of signals B and D. In fact, adders 25 and 27 advantageously are OR gates. The outputs of adders 25 and 27 are provided to a phase detector 29 which will provide the tracking signal T indicative of the alignment of the laser beam.

Signals A+C and B+D, respectively provided by adders 25 and 27, are shown in FIGS. 2 and 3. In FIG. 2, signals A+C and B+D are in phase, which will indicate a correct alignment of the laser beam. These signals rise as soon as signals A and D are at half their rising excursion and fall when signals B and C are at half their falling excursion. As shown in FIG. 3, corresponding to a misaligned laser beam, signal A+C has a slight phase lead over signal B+D. Signal A+C rises when signal A is at half its rising excursion and falls when signal C is at half its falling excursion. Signal B+D rises when signal D is at half its rising excursion and falls when signal B is at half its falling excursion.

In the example of FIG. 3, the phase lead of signal A+C indicates that the spot is too low on sensor 14. If the spot were too high, this would be indicated by a phase lead of signal B+D.

The delay-lines are used to correct the errors in the optical system and the different electrical circuits. All four delay-lines are needed, because the errors are in principle randomly distributed.

Limiter 20 may advantageously be comprised of a very high gain comparator receiving the corresponding sensor signal at one input and a reference voltage at the other input, this reference voltage being adjusted to the mean value of the sensor signal, for example by a resistor and capacitor network. The output signal of such a limiter could have sufficiently sharp edges to constitute a binary signal exploitable by the adjustable delay circuit 23.

Data slicer 21 is provided to obtain even sharper edges. It may e.g. be comprised of a comparator receiving the output signal of limiter 20 at one input and a constant reference voltage at the other input. The reference voltage will be halfway between the two power supply voltages of the circuit.

Figure 5:
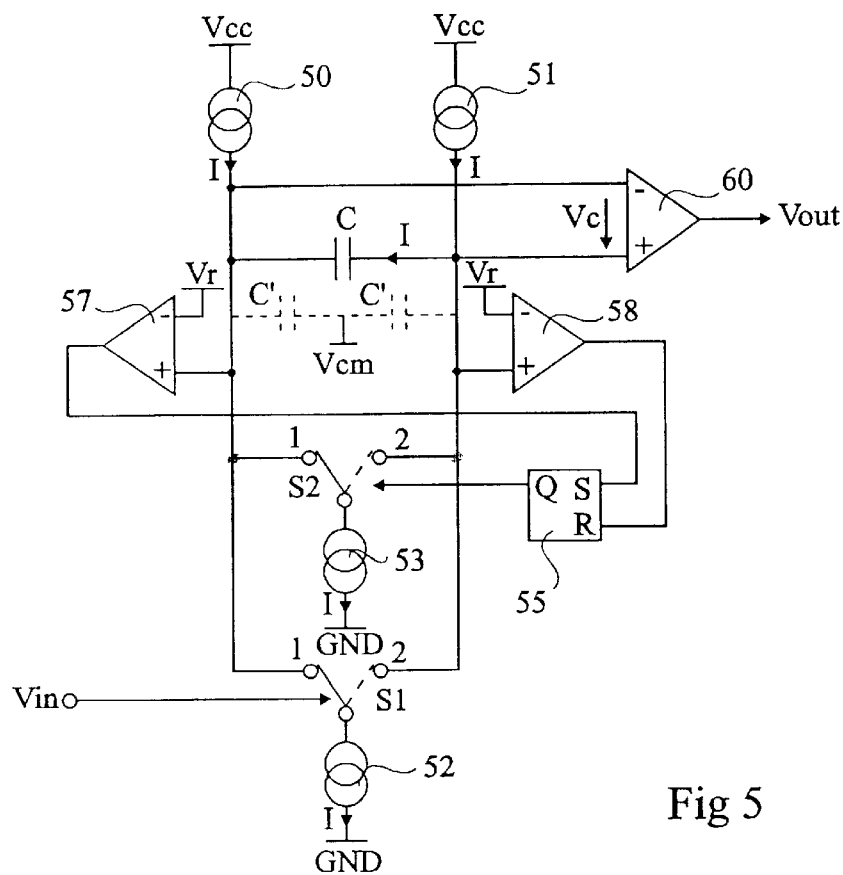
FIG. 5 shows an advantageous embodiment of an adjustable delay circuit usable in the circuit of FIG. 4.

FIG. 5 shows an advantageous embodiment of an adjustable edge delay circuit which operates on binary signals. It comprises two constant current sources 50 and 51, each coupling one of the terminals of a capacitor C to a supply voltage Vcc. A constant current source 52 has one terminal connected to ground GND and its other terminal is selectively connected to one of the two terminals of capacitor C by a switch S1. Switch S1 is controlled by the input signal to delay Vin. A constant current source 53 is, like source 52, connected to voltage GND and to either one of the terminals of capacitor C through a switch S2. Switch S2 is controlled by the output of a flip-flop 55, for example an RS flip-flop.

Current sources 50 and 51 deliver a same constant current I, while current sources 52 and 53 sink this same current I.

A first terminal of capacitor C is connected to the non-inverting input of a comparator 57 whose output is connected to the set input S of flip-flop 55. The inverting input of comparator 57 receives a constant reference voltage Vr. Similarly, the second terminal of capacitor C is connected to the non-inverting input of a comparator 58. The output of comparator 58 is connected to the reset input R of flip-flop 55. The inverting input of comparator 58 receives the same reference voltage Vr as comparator 57. The delayed signal Vout is provided by a comparator 60 whose inverting input is connected to the first terminal of capacitor C and whose non-inverting input is connected to the second terminal of capacitor C.

Since both terminals of capacitor C are only connected to high impedance elements, their common mode may float. To avoid this, capacitor C is preferably replaced with the circuit shown in dotted lines comprising two series connected capacitors C'. The connection node between these capacitors C' is coupled to a fixed common mode voltage Vcm, which may be one of the supply voltages. Such a connection does not change the operating principle of the circuit.

Figure 6:
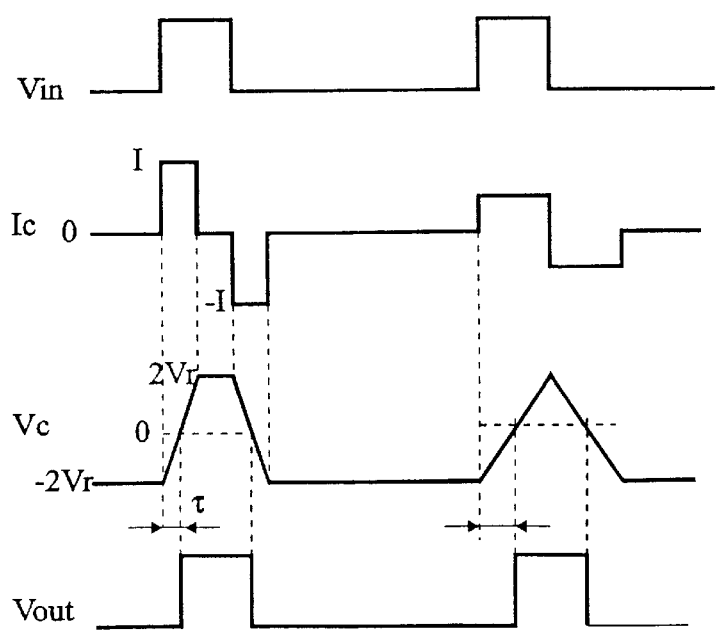
FIG. 6 shows signals over time for illustrating the operation of the delay circuit of FIG. 5.

FIG. 6 illustrates the input signal Vin, the current Ic in capacitor C, the voltage Vc across capacitor C and the output signal Vout.

The polarities of voltage Vc and current Ic are those indicated in FIG. 5, i.e. Ic is positive when it flows from right to left in capacitor C and Vc is the voltage between the non-inverting input and the inverting input of comparator 60.

Initially, the input signal Vin is low and the current Ic in capacitor C is zero, which means that voltage Vc is constant, here equal, for example, to a low threshold −2Vr. Signal Vout is low. It is assumed that switch S1 is in the position indicated by 2 and that switch S2 is in the shown position indicated by 1. Flip-flop 15 is in the set state. In this initial state, the current delivered by source 50 entirely flows through switch S2 into source 53, while the current delivered by source 51 entirely flows through switch S1 into source 52. No current flows through capacitor C.

When signal Vin goes high, switch S1 assumes shown position 1. Then, the current delivered by source 50 directly flows into sources 52 and 53, while the current I delivered by source 51 flows into sources 52 and 53 through capacitor C. The current in capacitor C thus switches to a positive value I. As a consequence, the voltage Vc across this capacitor increases linearly, starting from its initial value −2Vr. As soon as voltage Vc starts increasing, the output of comparator 57 goes low.

When the voltage Vc across capacitor C becomes zero, comparator 60 switches, whereby signal Vout goes high. The rising edge of signal Vout is thus delayed from the rising edge of signal Vin by a value τ, equal to 2Vr·C/I.

When the voltage at the non-inverting input of comparator 58 reaches value Vr, which is when the voltage Vc across capacitor C reaches value 2Vr, the output of comparator 58 goes high and resets flip-flop 55. Switch S2 then assumes position 2, where the current of source 51 directly flows into source 53, while the current of source 50 still flows into source 52 through switch S1. No current flows through capacitor C, whereby voltage Vc remains constant.

When signal Vin goes low again, S1 is set back to position 2, whereby the current of source 51 is directly delivered to sources 52 and 53, while the current of source 50 is delivered to sources 52 and 53 through capacitor C. A constant negative current −I then flows through capacitor C, whereby voltage Vc decreases linearly from value 2Vr. As soon as voltage Vc starts decreasing, the output of comparator 58 goes low.

When voltage Vc reaches zero again, comparator 60 switches, causing signal Vout to go low.

Finally, when the voltage at the non-inverting input of comparator 57 reaches value Vr, which is when voltage Vc reaches value −2Vr, the output of comparator 57 goes high and sets flip-flop 55. Switch S2 is set back to position 1, and the circuit is back in its initial conditions.

It will be noted that, since comparator 60 switches when voltage Vc is half-way between values −2Vr and 2Vr, and since the charge and discharge currents ±I, determining the rising and falling slopes of voltage Vc, are identical, a same delay τ is obtained for the rising edges and for the falling edges of signal Vin, which is desirable.

As shown by the expression of the delay τ given above, this delay is proportional to voltage Vr and inversely proportional to value I. Thus, each of the values Vr and I may be used to adjust the delay. The use of value Vr will be preferred because it allows a proportional adjustment. The delay also depends on value C, but this value is more complicate to adjust.

The right portion of FIG. 6 illustrates a limit operating condition. The current I is reduced to a value such that voltage Vc takes an entire time interval between a rising edge and the next falling edge of signal Vin to increase from value −2Vr up to value 2Vr. This corresponds to the maximum delay setting. Indeed, if the charge and discharge currents are further reduced, in this example, voltage Vc will not reach value 2Vr before it starts decreasing again, whereby the desirable symmetry is lost. In other words, value 4Vr·C/I should be smaller than the minimum time interval separating two consecutive edges of the input signal Vin.

The maximum obtainable delay, visible in the right portion of FIG. 6, is half this minimum time interval. In order to obtain a greater delay, comparator 60 may have a hysteresis cycle whose high threshold is slightly below threshold 2Vr and whose low threshold is slightly above threshold −2Vr. The maximum delay then approaches value 4Vr·C/I. The hysteresis cycle should be symmetrical to obtain an exact but delayed copy of the input signal. If a still greater delay is needed, several delay circuits will be cascaded.

A main difference between known solutions and the new solution according to the invention is the way the electronic system is implemented. Key-points are that all four signals from the sensors A,B,C,D are treated separately by limiter and delay lines. Two adders are used for making two input signals for a single phase-detector. The signals from the sensors are directly limited. This is done because the relevant information is represented in the phase of the signal and not in its amplitude. A quasi-linear delay-line is introduced after the limiter. Such solution would not be possible for analog delay lines. With analog delay-lines the group-delay is a key-parameter. If the group-delay changes of the signal band, the zero-crossings of the signals are influenced which introduces an offset in tracking. With quasi-linear delay-lines the amplitude and consequently the group-delay does not play any role. Changing the speed of the disk requires a change in the bandwidth of analog delay-lines. This means translation into an extended range over which the group-delay is stable. For high speed of the optical recording medium this requires very high bandwidths. With a quasi-linear delay-line the change of speed can easily be adopted by changing a biasing current or a reference voltage. The delay-lines are used to correct errors in the optical and electrical system. Signals A & C and B & D are added just before the phase-detector. Only a single phase-detector is needed to determine the phase difference between the signals A+C and B+D of the detectors.

What is claimed is:

1. A tracking system for an optical disk, comprising:
    sensors for receiving a beam reflected by the disk and producing sensor signals;
    one respective processing channel associated with each of said sensor signals, each processing channel including means for producing a binary signal from a sensor signal, and an adjustable edge delay circuit operating on said binary signal; and
    a phase detector comparing output signals of said adjustable edge delay circuits.

2. The tracking system according to claim 1, wherein:
    said means for producing said binary signal comprises a limiter and a data slicer, said limiter having an output signal which is input to said data slicer, wherein said data slicer outputs said binary signal.

3. The tracking system according to claim 1, wherein said edge delay circuit comprises:
    means for charging a capacitor at a constant current when a corresponding binary signal switches to a first logic state;
    means for discharging said capacitor at said constant current when said binary signal switches to a second logic state;
    means for stopping, charging and discharging said capacitor when the voltage across said capacitor is between a high threshold and a low threshold, and before a switching of said binary signal; and
    a first comparator for switching the state of an output signal when the voltage across said capacitor crosses a third threshold between said first and said second thresholds.

4. The tracking system according to claim 3, wherein said means for charging, discharging and stopping comprise:
    first and second equal value constant current sources coupled to a first supply terminal;
    a first switch controlled by said binary signal for selectively coupling said first current source to said capacitor;
    a flip-flop set to a first state when said high threshold is reached, and said flip-flop set to a second state when said low threshold is reached;
    a second switch controlled by said flip-flop for selectively coupling said second current source to said capacitor; and
    third and fourth constant current sources having values equal to those of said first and second current sources, each coupling a supply terminal to a respective terminal of said capacitor.

5. The tracking system according to claim 4, wherein said adjustable delay circuit comprises:
    a second comparator for comparing a first reference voltage and voltage on a first terminal of said capacitor for setting said flip-flop to said first state; and
    a third comparator for comparing said first reference voltage and voltage on a second terminal of said capacitor for setting said flip-flop to said second state.

6. The tracking system according to claim 1, further comprising:
    a servo-control system for displacing said beam in one direction perpendicularly to disk tracks when said phase detector indicates a phase lag, and for displacing said beam in the opposite direction when said phase detector indicates a phase lead.

7. A tracking system for an optical disk, comprising:
    a matrix of four sensors receiving a beam reflected by said disk and each of said sensors producing a sensor signal;
    one respective processing channel associated with each of said sensor signals, each processing channels including means for reproducing a binary signal from a sensor signal, and an adjustable edge delay circuit operating on said binary signal;
    one respective adder coupled to each pair of channels corresponding to diagonal sensors of a matrix; and
    a phase detector comparing outputs of said adders.

8. The tracking system according to claim 7, wherein said means for producing said binary signal comprises:
    a limiter, the output signal of which is input to a data slicer which outputs said binary signal.

9. The tracking system according to claim 7, wherein said edge delay circuit comprises:
    means for charging a capacitor at a constant current when a corresponding binary signal switches to a first logic state;
    means for discharging the capacitor at said constant current when said binary signal switches to a second logic state;

means for stopping, charging and discharging said capacitor when the voltage across said capacitor is between a high threshold and a low threshold, and before a switching of said binary signal; and a first comparator for switching the state of an output signal when the voltage across said capacitor crosses a third threshold between said first and said second thresholds.

10. The tracking system according to claim 9, wherein said means for charging, discharging and stopping comprise:

first and second equal value constant current sources coupled to a first supply terminal;

a first switch controlled by said binary signal for selectively coupling said first current source to said capacitor;

a flip-flop set to a first state when said high threshold is reached, and said flip-flop set to a second state when said low threshold is reached;

a second switch controlled by said flip-flop for selectively coupling said second current source to said capacitor; and third and fourth constant current sources having values equal to those of said first and second current sources, each coupling a supply terminal to a respective terminal of said capacitor.

11. The tracking system according to claim 10, wherein said adjustable delay circuit comprises:

a second comparator for comparing a first reference voltage and voltage on a first terminal of said capacitor for setting said flip-flop to said first state; and a third comparator for comparing said first reference voltage and voltage on a second terminal of said capacitor for setting said flip-flop to said second state.

12. The tracking system according to claim 7, further comprising:

a servo-control system for displacing said beam in one direction perpendicularly to disk tracks when said phase detector indicates a phase lag, and for displacing said beam in the opposite direction when said phase detector indicates a phase lead.

* * * * *